United States Patent
Lauk et al.

(10) Patent No.: US 7,160,335 B2
(45) Date of Patent: Jan. 9, 2007

(54) ANTHRAQUINONE DYES

(75) Inventors: Urs Lauk, Zürich (CH); Patric Nowack, Lörrach (DE); Alfons Arquint, Basel (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 192 days.

(21) Appl. No.: 10/508,715

(22) PCT Filed: Mar. 13, 2003

(86) PCT No.: PCT/EP03/02615

§ 371 (c)(1), (2), (4) Date: Sep. 20, 2004

(87) PCT Pub. No.: WO03/080735

PCT Pub. Date: Oct. 2, 2003

(65) Prior Publication Data
US 2005/0177958 A1    Aug. 18, 2005

(30) Foreign Application Priority Data
Mar. 22, 2002  (EP) .................. 02405225

(51) Int. Cl.
| C09B 1/20 | (2006.01) |
| C09B 1/54 | (2006.01) |
| C09B 1/58 | (2006.01) |
| C09B 1/56 | (2006.01) |
| G06B 5/22 | (2006.01) |
| D06P 3/26 | (2006.01) |
| D06P 3/54 | (2006.01) |

(52) U.S. Cl. ............... 8/512; 8/515; 8/516; 552/208; 552/221; 552/223; 552/224; 552/225; 552/226; 552/234; 552/238; 552/241; 552/243; 552/255; 552/256

(58) Field of Classification Search ............ 552/238
See application file for complete search history.

(56) References Cited

U.S. PATENT DOCUMENTS
| 4,402,854 A * | 9/1983 | Moeller et al. ........ 252/299.1 |
| 4,585,574 A | 4/1986 | Blunck et al. ......... 252/299.1 |
| 6,485,559 B1 | 11/2002 | Adam ................. 106/493 |
| 2004/0040099 A1 | 3/2004 | Sutter et al. ............ 8/643 |
| 2004/0045102 A1 | 3/2004 | Hildebrand et al. ...... 8/509 |
| 2004/0068808 A1 | 4/2004 | Hildebrand et al. ...... 8/529 |

FOREIGN PATENT DOCUMENTS
| EP | 1127922 | 8/2001 |
| GB | 1402704 | 8/1975 |
| GB | 1445949 | 8/1976 |

OTHER PUBLICATIONS
Patent Abstracts of Japan Publication No. 62265355, (1987).
* cited by examiner

*Primary Examiner*—Margaret Einsmann
*Assistant Examiner*—Amina Khan
(74) *Attorney, Agent, or Firm*—Kevin T. Mansfield; Shiela A. Loggins

(57) ABSTRACT

The present invention relates to a compound of formula I

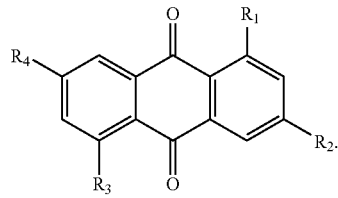

(I)

wherein $R_1$ and $R_3$ are each independently of the other —$NHR_5$, $NHSO_2R_5$, —$NHCOR_5$, —$OR_6$ or —$SR_7$, $R_2$ and $R_4$ are each independently of the other —$OR_6$ or —$SR_7$, with the proviso that not all of the substituents $R_1$ to $R_4$ are —$SR_7$, $R_5$ is hydrogen, alkyl, aryl, aralkyl or a group of formula —$(C_nH_{2n}X)_m$—H wherein X is —O—, —S—, —$SO_2$—, —NH—, —$NR_8$—, —CONH— or —$CONR_8$— and $R_8$ is alkyl or aryl, n is a number from 2 to 6 and m is a number from 1 to 10, $R_6$ is aryl or heteroaryl and $R_7$ is alkyl, aryl, heteroaryl or a group of formula —$(C_nH_{2n}X)_m$—H wherein X is —O—, —S—, —$SO_2$—, —NH—, —$NR_8$—, CONH— or —$CONR_8$— and $R_8$ is alkyl or aryl, to a process for the preparation thereof and to the use thereof in a method of producing mass-coloured plastics or polymeric colour particles.

14 Claims, No Drawings

ANTHRAQUINONE DYES

The present invention relates to novel anthraquinone dyes, to a process for the preparation thereof and to the use thereof in a method of producing mass-coloured plastics or polymeric colour particles.

Dyes, especially dyes of the anthraquinone series, are known for mass-colouring plastics. For example there are described in U.S. Pat. No. 5,367,039 1,4,5,8-tetrasubstituted anthraquinones having (meth)acryloyl groups which can be copolymerised with vinyl monomers and are thus suitable for the production of coloured vinyl polymers.

The dyes used until now do not, however, meet the highest requirements in terms of light fastness and, especially, thermostability.

There is accordingly a need for novel thermostable dyes that produce colorations having a high tinctorial strength and exhibiting light fastness, especially high-temperature light fastness, and that have good all-round fastness properties.

It has now, surprisingly, been found that the dyes according to the invention substantially meet the above criteria.

The present invention accordingly relates to a compound of formula I

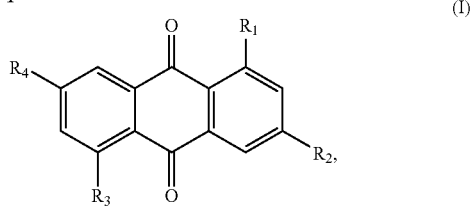

(I)

wherein
$R_1$ and $R_3$ are each independently of the other —$NHR_5$, —$NHSO_2R_5$, —$NHCOR_5$, —$OR_6$ or —$SR_7$,
$R_2$ and $R_4$ are each independently of the other —$OR_6$ or —$SR_7$,
with the proviso that not all of the substituents $R_1$ to $R_4$ are —$SR_7$,
$R_5$ is hydrogen, alkyl, aryl, aralkyl or a group of formula —$(C_nH_{2n}X)_m$—H wherein X is —O—, —S—, —$SO_2$—, —NH—, —$NR_8$—, —CONH— or —$CONR_8$— and $R_8$ is alkyl or aryl, n is a number from and m is a number from 1 to 10,
$R_6$ is aryl or heteroaryl and $R_7$ is alkyl, aryl, heteroaryl or a group of formula —$(C_nH_{2n}X)_m$—H wherein X is —O—, —S—, —$SO_2$—, —NH—, —$NR_8$—, —CONH— or —$CONR_8$— and $R_8$ is alkyl or aryl.

The substituents $R_1$ and $R_3$ may be identical or different; preferably, $R_1$ and $R_3$ are identical.

Likewise, $R_2$ and $R_4$ may be identical or different, but are preferably identical.

Any radical denoting alkyl may be a straight-chain or branched alkyl radical that may be substituted by one or more hydroxy groups, amino groups or halogen atoms.

Examples of alkyl groups include methyl, ethyl, n-propyl, isopropyl, n-butyl, isobutyl, sec-butyl, tert-butyl, n-pentyl, isopentyl, neopentyl, n-hexyl, n-heptyl, n-octyl, isooctyl, n-decyl and n-dodecyl.

Substituted alkyl groups include, for example, 2-hydroxyethyl, 2-hydroxypropyl, 4-hydroxybutyl, 2-aminoethyl, 2-aminopropyl, 4-aminobutyl, 2-chloroethyl, 2-bromoethyl and 4-chlorobutyl.

The aryl radicals designated $R_5$ to $R_8$ have preferably from 5 to 24, especially from 6 to 14, carbon atoms and may be substituted, for example, by hydroxy, $C_1$–$C_4$alkyl, $C_1$–$C_4$alkoxy, $C_1$–$C_4$hydroxyalkyl, halogen or by the radical —NH—CO—R wherein R is amino, $C_1$–$C_4$alkyl, unsubstituted phenyl or phenyl substituted by hydroxy, $C_1$–$C_4$alkyl, $C_1$–$C_4$alkoxy, $C_1$–$C_4$-hydroxyalkyl or by halogen.

Examples of suitable aryl groups include phenyl, tolyl, mesityl, isityl, 2-hydroxyphenyl, 4-hydroxyphenyl, 2-chlorophenyl, 4-chlorophenyl, 2,6-dichlorophenyl, 2-aminophenyl, 3-aminophenyl, 4-aminophenyl, 4-methoxyphenyl, 4-ethoxyphenyl, 4-acetylaminophenyl, naphthyl and phenanthryl.

Aralkyl groups as $R_5$ have preferably from 6 to 30, especially from 7 to 12, carbon atoms and may be unsubstituted or substituted by one or more $C_1$–$C_4$alkyl groups, $C_1$–$C_4$alkoxy groups, halogen atoms or —NH—CO—R radicals wherein R is amino, $C_1$–$C_4$alkyl, unsubstituted phenyl or phenyl substituted by $C_1$–$C_4$alkyl, $C_1$–$C_4$alkoxy or by halogen.

Examples of suitable aralkyl groups include benzyl, 2-phenylethyl, tolylmethyl, mesitylmethyl and 4-chlorophenylmethyl.

Heteroaryl as $R_6$ or $R_7$ contains preferably 4 or 5 carbon atoms and one or two hetero atoms from the group O, S and N. It may be, for example, pyrrolyl, furyl, thiophenyl, oxazolyl, thiazolyl, pyridyl, pyrazinyl, pyrimidinyl, pyridazinyl, indolyl, purinyl or quinolyl.

In formula I, $R_1$ and $R_3$ are preferably —$NHR_5$ or —$SR_7$.

Preference is given to compounds of formula I wherein $R_1$ and $R_3$ are —$NHR_5$ or —$SR_7$ and $R_5$ and $R_7$ are aryl or hydroxyalkyl.

Special preference is given to compounds of formula I wherein $R_1$ and $R_3$ are —$NHR_5$ or —$SR_7$, $R_5$ is phenyl, mesityl or 2-hydroxyethyl and $R_7$ is phenyl.

$R_2$ and $R_4$ in formula I are preferably —$SR_7$.

In especially preferred compounds of formula I, $R_2$ and $R_4$ are —$SR_7$ wherein $R_7$ is aryl or hydroxyalkyl, especially phenyl or 2-hydroxyethyl.

Special preference is given to compounds of formulae Ia–Ic

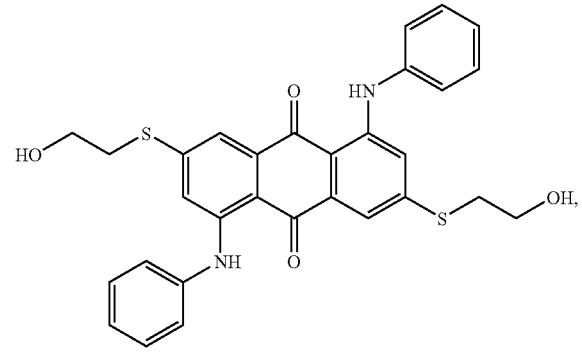

(Ia)

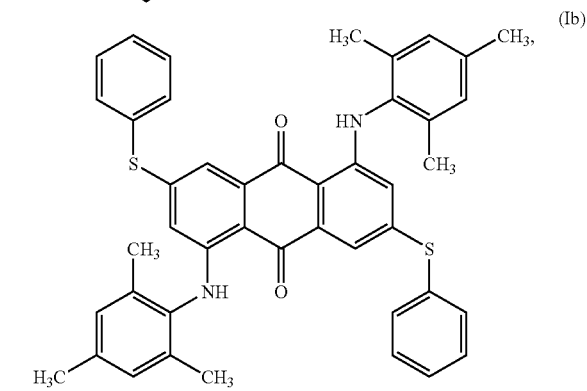

(Ib)

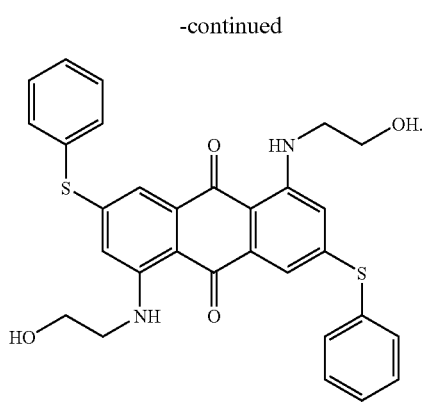

(Ic)

The compounds of formula I can be prepared, for example, from 1,3,5,7-tetrabromoanthraquinone by reaction with suitable nucleophiles. In that reaction, advantageously in a first step the radicals $R_1$ and $R_3$, which are preferably identical, are introduced into the reactive 1,5-positions. In a further nucleophilic substitution reaction, the remaining bromine atoms in the 3,7-positions are replaced by $R_2$ and $R_4$, which are likewise preferably identical. When the radicals $R_1$ to $R_4$ are identical, the reaction can also be carried out in a single step.

1,3,5,7-Tetrabromoanthraquinone can, for example, be prepared in two steps from 1,5-diaminoanthraquinone. Bromination in aqueous hydrochloric acid yields 1,5diamino-2,4,6,8-tetrabromoanthraquinone (R. Scholl, F. Eberle, W. Tritsch: Monatshefte für Chemie 32, 1055 (1911)), which can be converted, by diazotization and subsequent reduction, into 1,3,5,7-tetrabromoanthraquinone (H. Kopf, J. Fuchs, K. H. Eisenmann: Annalen der Chemie 585, 178 (1954); F. Ullmann, O. Eiser: Chemische Berichte 49, 2154 (1916)).

The invention relates also to a process for the preparation of a compound of formula I which comprises reacting 1,3,5,7-tetrabromoanthraquinone with a compound $R_1$—H or with a mixture of the compounds $R_1$—H and $R_3$—H in a first reaction step, and then reacting the so-prepared intermediate with a compound $R_2$—H or with a mixture of the compounds $R_2$—H and $R_4$—H, $R_1$, $R_2$, $R_3$ and $R_4$ being as defined hereinabove.

The compounds $R_1$—H, $R_2$—H, $R_3$—H and $R_4$—H are known or can be prepared in a manner known per se.

The present invention relates also to a method of producing mass-coloured plastics or polymeric colour particles which comprises mixing a high molecular weight organic material and a tinctorially effective amount of at least one compound of formula (I).

The colouring of the high molecular weight organic substances using the dye of formula (I) is carried out, for example, by using roll mills, mixing apparatus or grinding apparatus to admix such a dye with such substrates, the dye being dissolved or finely distributed in the high molecular weight material. The high molecular weight organic material with the admixed dye is then processed according to methods known per se, such as, for example, calendering, compression moulding, extrusion, coating, spinning, pouring or injection moulding, as a result of which the coloured material acquires its final form. Admixture of the dye can also be effected immediately prior to the actual processing step, for example by simultaneously continuously feeding, directly into the intake zone of an extruder, a solid, for example pulverulent, dye and a granulated or pulverulent high molecular weight organic material and, where appropriate, also other ingredients, such as additives, the constituents being mixed in just before being processed. Generally, however, preference is given to mixing the dye into the high molecular weight organic material beforehand, since more uniformly coloured substrates can be obtained.

In order to produce non-rigid shaped articles or to reduce their brittleness, it is frequently desirable to incorporate so-called plasticisers into the high molecular weight compounds prior to shaping. There may be used as plasticisers, for example, esters of phosphoric acid, phthalic acid or sebacic acid. In the method according to the invention, the plasticisers can be incorporated into the polymers before or after the incorporation of the colorant. It is also possible, in order to achieve different colour shades, to add to the high molecular weight organic substances, in addition to the dye of formula (I), also other pigments or other colorants in the desired amounts, optionally together with further additives, for example fillers or siccatives.

Preference is given to the colouring of thermoplastic plastics especially in the form of fibres. Preferred high molecular weight organic materials that can be coloured in accordance with the invention are very generally polymers having a dielectric constant $\geq 2.5$, especially polyester, polycarbonate (PC), polystyrene (PS), polymethyl methacrylate (PMMA), polyamide, polyethylene, polypropylene, styrene/acrylonitrile (SAN) or acrylonitrile/butadiene/styrene (ABS). Polyester and polyamide are especially preferred. More especially preferred are linear aromatic polyesters, which can be obtained by polycondensation of terephthalic acid and glycols, especially ethylene glycol, or condensation products of terephthalic acid and 1,4-bis(hydroxymethyl)cyclohexane, for example polyethylene terephthalate (PET) or polybutylene terephthalate (PBT); also polycarbonates, e.g. those obtained from α,α-dimethyl4,4-dihydroxy-diphenylmethane and phosgene, or polymers based on polyvinyl chloride and also on polyamide, for example polyamide 6 or polyamide 6.6.

When the compounds of formula (I) according to the invention contain at least two NH, OH or SH groups, mixing the dye with the monomers and incorporation thereof in the form of a comonomer directly into the polymer skeleton is possible, provided that the monomers contain reactive groups that react with the active hydrogen atoms of the NH, OH or SH groups. Examples of such monomers include epoxides (epoxy resins), isocyanates (polyurethanes) and carboxylic acid chlorides (polyamides, polyesters).

The invention accordingly relates also to a method of producing mass-coloured plastics or polymeric colour particles that comprises causing a mixture comprising at least one monomer that contains at least one NH—, OH— or SH-reactive group and is capable of polymerisation, polyaddition or polycondensation reactions to react with at least one compound of formula I containing at least two NH, OH or SH groups.

The present invention relates also to the use of compounds of formula I in the production of mass-coloured plastics or polymeric colour particles and to the plastics or polymeric colour particles coloured using the compounds of formula I.

The dyes according to the invention impart to the abovementioned materials, especially polyester materials, level colour shades of high tinctorial strength that have good in-use fastness properties, especially very good high-temperature light fastness.

The dyes according to the invention can furthermore be used for coating applications of any kind.

The dyes according to the invention can also readily be used together with other dyes to produce blended shades.

The anthraquinone dyes of formula (I) according to the invention are furthermore suitable as colorants in the production of colour filters, especially for visible light in the range from 400 to 700 nm, for liquid crystal displays (LCDs) or charge combined devices (CCDs).

The production of colour filters by sequential application of a red, blue and green colorant to a suitable substrate, for example amorphous silicon, is described in GB-A 2 182 165. The colour filters can be coated, for example, using inks, especially printing inks, that comprise the anthraquinone dyes according to the invention, or can be produced, for example, by blending the anthraquinone dyes according to the invention with chemically, thermally or photolytically structurable high molecular weight material. The further production can be carried out, for example, analogously to EP-A 654 711 by application to a substrate, such as an LCD, followed by photo-structuring and development. Other documents that describe the production of colour filters include U.S. Pat. No. 5,624,467, Displays 14/2, 115 (1993) and WO 98/45756.

The colour filters that are produced for liquid crystal displays (LCDs) using the anthraquinone dyes according to the invention are distinguished by high transmission of colour dots.

The invention relates also to the use of an anthraquinone dye according to the invention as a colorant in the production of colour filters.

The following Examples serve to illustrate the invention.

EXAMPLE 1

A. 1,5-Bis(2-hydroxyethylamino)3,7-dibromoanthraquinone 90 g of 1,3,5,7-tetrabromoanthraquinone, 142.3 g of 2-aminoethanol, 18.6 g of sodium acetate and 0.52 g of copper(I) acetate are introduced into a laboratory reaction apparatus and stirred for 3 hours at 130° C. After cooling to room temperature (RT), the reaction mixture is taken up in ethanol and poured into water. After filtration and drying, 24 g (65%) of product are obtained.

B. 1,5-Bis(2-hydroxyethylamino)-3,7-bis(phenylmercapto)-anthraquinone 24 g of 1,5-bis(2-hydroxyethylamino)-3,7-dibromoanthraquinone are introduced at RT into 100 ml of dimethylformamide (DMF). After the addition of 16.3 g of sodium thiophenolate, the mixture is heated to 120° C. and maintained at that temperature for one hour. After cooling the mixture to RT, 100 ml of methanol are added thereto. The precipitate is filtered off, washed with a methanol/water mixture (1:1) and dried in vacuo.
Yield: 18.6 g (68.5%)

EXAMPLE 2

A. 1,5-Bis(phenylamino)-3,7-dibromoanthraquinone 20 g of 1,3,5,7-tetrabromoanthraquinone, 70 ml of aniline, 9.3 g of sodium acetate and 0.26 g of copper(I) acetate are introduced into a laboratory reaction apparatus and stirred for 2 hours at 150° C. After cooling the mixture to RT, the crude product is precipitated using ethanol, filtered off, washed and dried in vacuo.
Yield: 16.8 g (80%)

B. 1,5-Bis(phenylamino)-3,7-bis(2-hydroxyethylmercapto)-anthraquinone 16.8 g of 1,5-bis(phenylamino)-3,7-dibromoanthraquinone and 5.6 g of 2-hydroxyethylmercaptan are introduced at RT into 50 ml of DMF. After heating the mixture to 110° C., a solution of 8.16 g of potassium tert-butanolate in 90 ml of DMF is added. The mixture is stirred for 2 hours at 110° C. 500 ml of water are then added dropwise. The precipitate is filtered off, washed and dried in vacuo.
Yield: 11.4 g (70%)

EXAMPLE 3

A. 1,5-Bis(mesitylamino)-3,7-dibromoanthraquinone 37 g of 1,3,5,7-tetrabromoanthraquinone, 12.3 ml of mesidine, 17.3 g of sodium acetate and 0.5 g of copper(I) acetate are introduced into a laboratory reaction apparatus and stirred for 7 hours at 170° C. After cooling to RT, the crude product is precipitated by the addition of 1 liter of 2N HCl and recrystallised from ethanol. After filtration and drying 21 g (47%) of product are obtained.

B. 1,5-Bis(mesitylamino)-3,7-bis(phenylmercapto)-anthraquinone 16.5 g of 1,5-bis(mesitylamino)-3,7-dibromoanthraquinone are suspended at RT in 50 ml of DMF and heated to 120° C. After cooling to 50° C., a suspension of 8.5 g of sodium thiophenolate in 25 ml of DMF is added thereto. The mixture is then heated to 120° C. again and stirred at that temperature for 1.5 hours. After cooling the mixture to 60° C., 100 ml of methanol are added and the mixture is stirred overnight at RT. The precipitate is filtered off, washed with a methanol/water mixture (1:1) and dried in vacuo.
Yield: 11.2 g (62%)

EXAMPLE 4

1,3,5,7-Tetrakis(phenylmercapto)-anthraquinone 90 g of 1,3,5,7-tetrabromoanthraquinone and 50 g of sodium thiophenolate are suspended at 70° C. in 150 ml of DMF in a laboratory reaction apparatus. The reaction mixture is stirred for 5 hours at 120° C. After cooling to RT, the precipitate is filtered off, washed with ethanol and dried in vacuo.
Yield: 22.6 g (73%)

II. Application Examples

II.1. Production of a Colour Filter for Liquid Crystal Displays (LCDs)

In a 100 ml glass vessel containing 83.3 g of zirconium ceramic beads, 2.8 g of the anthraquinone dye according to Example 1, 0.28 g of Solsperse® 5000, 4.10 g of Disperbyk® 161 (dispersing agent, 30% solution of a high molecular weight block copolymer, containing groups having affinity for the pigment, in n-butyl acetate/1-methoxy-2-propyl acetate 1:6, BYK Chemie) and 14.62 g of 1-methoxy-2-propyl acetate (MPA) are stirred at 23° C. for 10 minutes at 1000 revs/min. and for 180 minutes at 3000 revs/min. using a Dispermat. After the addition of 4.01 g of an acrylate polymer binder (35% solution in MPA), stirring is carried out at room temperature for 30 minutes at 3000 revs/min.

Following removal of the beads, the dispersion is diluted with an equal weight of MPA.

Using a spin-coating apparatus, a glass substrate (Corning type 1737-F) is coated with the resulting dispersion and centrifuged for 30 seconds at 1000 revs/min. The layer is dried on a hot plate for 2 minutes at 100° C. and for 5 minutes at 200° C. The resulting layer thickness is 0.4 μm.

The following anthraquinone dyes (Table 1), which are likewise suitable for mass-colouring plastics, can be prepared analogously to Example 1:

TABLE 1

(I)

*[Anthraquinone structure with substituents $R_1$, $R_2$, $R_3$, $R_4$]*

| $R_1$ | $R_2$ | $R_3$ | $R_4$ |
|---|---|---|---|
| Ph–NH– | Ph–S– | Ph–NH– | Ph–S– |
| Ph–NH– | Ph–O– | Ph–NH– | Ph–O– |
| Ph–NH– | 2,6-dimethylphenyl–O– | Ph–NH– | 2,6-dimethylphenyl–O– |
| Ph–NH– | 2,5-dichlorophenyl–S– | Ph–NH– | 2,5-dichlorophenyl–S– |
| Ph–NH– | 4-CH₃O-phenyl–S– | Ph–NH– | 4-CH₃O-phenyl–S– |
| Ph–NH– | benzyl–S– | Ph–NH– | benzyl–S– |
| Ph–NH– | 2-naphthyl–S– | Ph–NH– | 2-naphthyl–S– |
| Ph–NH– | 4-CH₃-phenyl–S– | Ph–NH– | 4-CH₃-phenyl–S– |
| Ph–NH– | 2,6-dimethylphenyl–S– | Ph–NH– | 2,6-dimethylphenyl–S– |

TABLE 1-continued
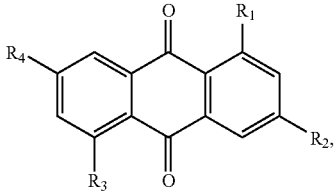
(I)
| R₁ | R₂ | R₃ | R₄ |
|---|---|---|---|
| 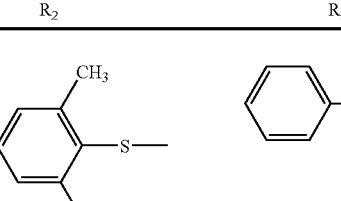 | 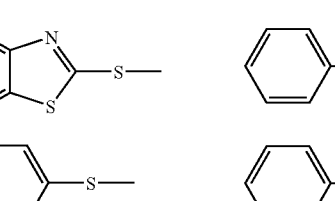 | 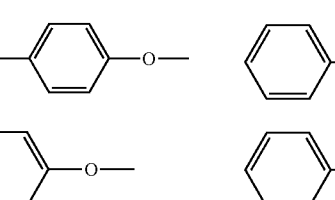 | 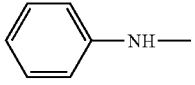 |
| 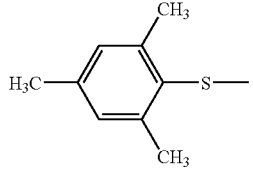 | 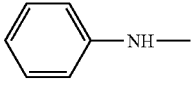 | 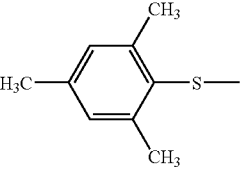 | 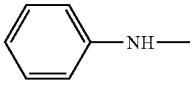 |
| 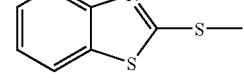 | 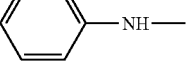 | 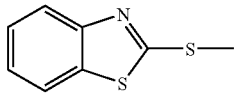 | 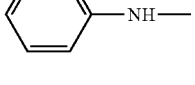 |
| 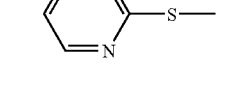 | 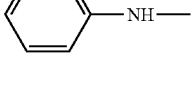 | 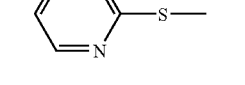 | 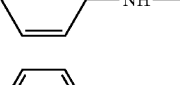 |
| 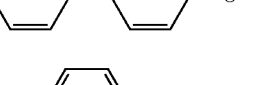 | 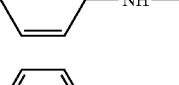 | 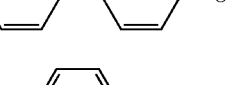 | 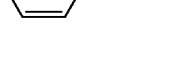 |
| 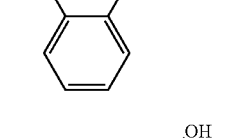 | 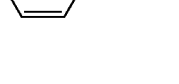 | 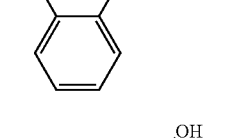 | 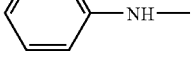 |
| 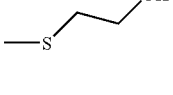 | 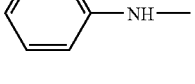 | 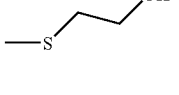 | 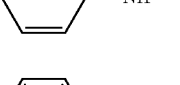 |
| 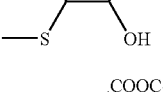 | 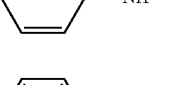 | 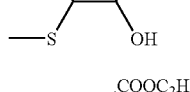 | 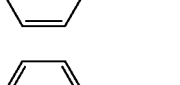 |
| 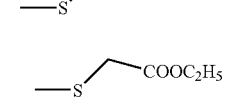 | 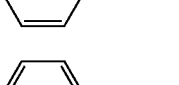 | 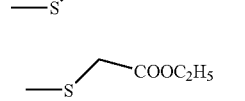 | 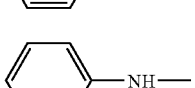 |
| 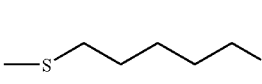 | 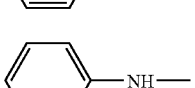 | 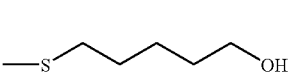 | 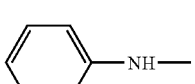 |
| 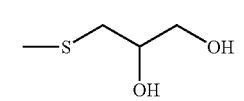 | 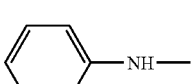 | 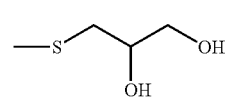 | |

TABLE 1-continued (I)

| R₁ | R₂ | R₃ | R₄ |
|---|---|---|---|
| 2,6-dimethylphenyl-NH— | phenyl-S— | 2,6-dimethylphenyl-NH— | phenyl-S— |
| 2,6-dimethylphenyl-NH— | phenyl-O— | 2,6-dimethylphenyl-NH— | phenyl-O— |
| 2,6-dimethylphenyl-NH— | 2,6-dimethylphenyl-O— | 2,6-dimethylphenyl-NH— | 2,6-dimethylphenyl-O— |
| 2,6-dimethylphenyl-NH— | 2,5-dichlorophenyl-S— | 2,6-dimethylphenyl-NH— | 2,5-dichlorophenyl-S— |
| 2,6-dimethylphenyl-NH— | 4-methoxyphenyl-S— | 2,6-dimethylphenyl-NH— | 4-methoxyphenyl-S— |
| 2,6-dimethylphenyl-NH— | benzyl-S— | 2,6-dimethylphenyl-NH— | benzyl-S— |
| 2,6-dimethylphenyl-NH— | 2-naphthyl-S— | 2,6-dimethylphenyl-NH— | 2-naphthyl-S— |

TABLE 1-continued (I)

| R₁ | R₂ | R₃ | R₄ |
|---|---|---|---|
| 2,6-dimethylphenyl-NH- | 4-methylphenyl-S- | 2,6-dimethylphenyl-NH- | 4-methylphenyl-S- |
| 2,6-dimethylphenyl-NH- | 2,4,6-trimethylphenyl-S- | 2,6-dimethylphenyl-NH- | 2,4,6-trimethylphenyl-S- |
| 2,6-dimethylphenyl-NH- | 2,6-dimethylphenyl-S- | 2,6-dimethylphenyl-NH- | 2,6-dimethylphenyl-S- |
| 2,6-dimethylphenyl-NH- | benzothiazol-2-yl-S- | 2,6-dimethylphenyl-NH- | benzothiazol-2-yl-S- |
| 2,6-dimethylphenyl-NH- | pyridin-2-yl-S- | 2,6-dimethylphenyl-NH- | pyridin-2-yl-S- |
| 2,6-dimethylphenyl-NH- | 4-phenylphenyl-O- | 2,6-dimethylphenyl-NH- | 4-phenylphenyl-O- |
| 2,6-dimethylphenyl-NH- | naphth-1-yl-O- | 2,6-dimethylphenyl-NH- | naphth-1-yl-O- |

TABLE 1-continued

Structure (I): Anthraquinone core with substituents R1 (position 1), R2 (position 3), R3 (position 5), R4 (position 7), and carbonyls at 9,10 positions.

| R1 | R2 | R3 | R4 |
|---|---|---|---|
| 2,6-dimethylphenyl-NH— | —S-CH2CH2-OH | 2,6-dimethylphenyl-NH— | —S-CH2CH2-OH |
| 2,6-dimethylphenyl-NH— | —S-CH(CH3)-CH(OH)-CH3 | 2,6-dimethylphenyl-NH— | —S-CH(CH3)-CH(OH)-CH3 |
| 2,6-dimethylphenyl-NH— | —S-CH2CH2-COOC2H5 | 2,6-dimethylphenyl-NH— | —S-CH2CH2-COOC2H5 |
| 2,6-dimethylphenyl-NH— | —S-CH2-COOC2H5 | 2,6-dimethylphenyl-NH— | —S-CH2-COOC2H5 |
| 2,6-dimethylphenyl-NH— | —S-(CH2)4-OH | 2,6-dimethylphenyl-NH— | —S-(CH2)4-OH |
| 2,6-dimethylphenyl-NH— | —S-CH2-CH(OH)-CH2-OH | 2,6-dimethylphenyl-NH— | —S-CH2-CH(OH)-CH2-OH |
| 2,4,6-trimethylphenyl-NH— | —S-phenyl | 2,4,6-trimethylphenyl-NH— | —S-phenyl |

TABLE 1-continued
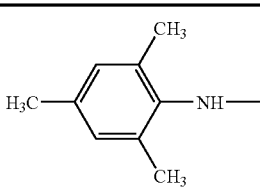
(I)
| R₁ | R₂ | R₃ | R₄ |
|---|---|---|---|
| 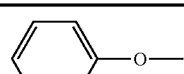 | 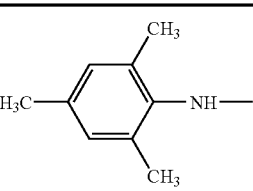 | 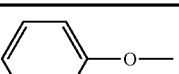 | 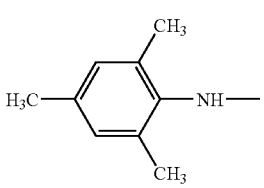 |
| 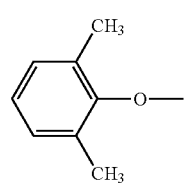 | 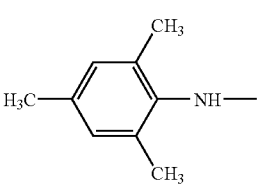 | 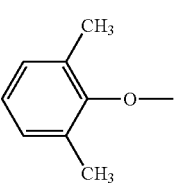 | 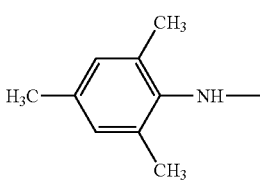 |
| 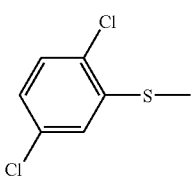 | 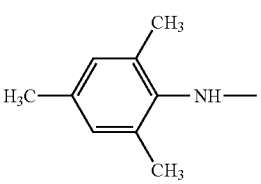 | 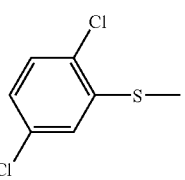 | 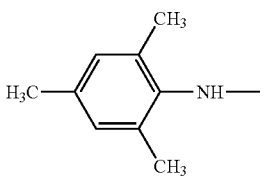 |
| 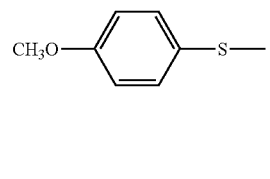 | 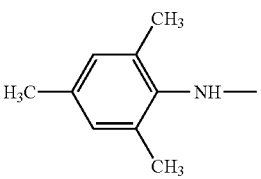 | 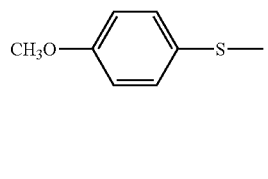 | 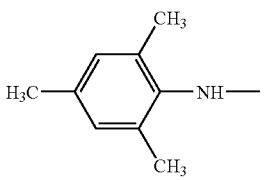 |
| 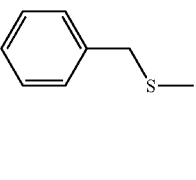 | 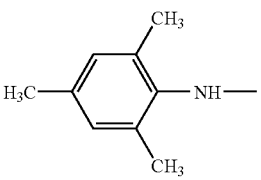 | 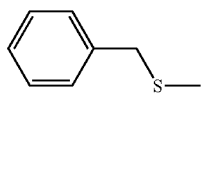 | 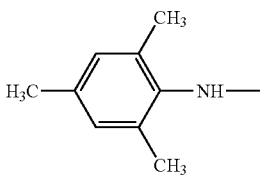 |
| 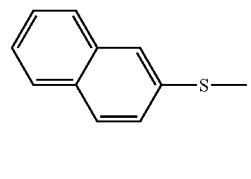 | 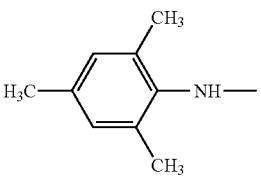 | 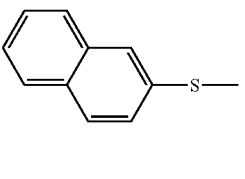 | 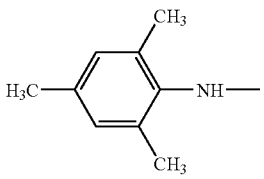 |
| 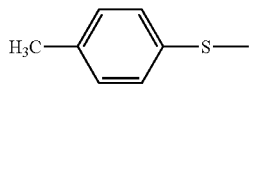 | 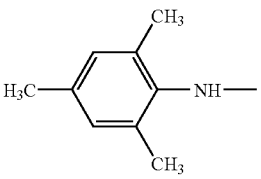 | 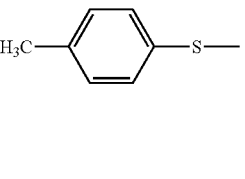 | |

TABLE 1-continued
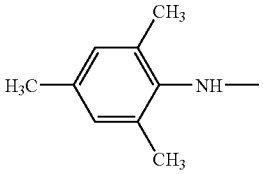
(I)
| R₁ | R₂ | R₃ | R₄ |
|---|---|---|---|
| 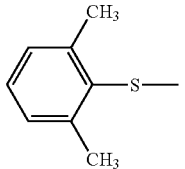 | 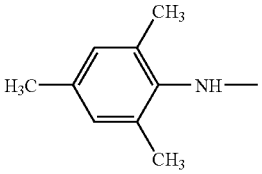 | 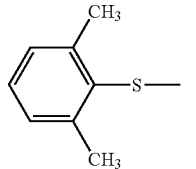 | 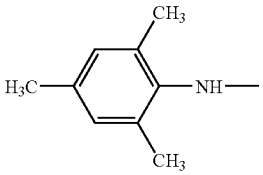 |
| 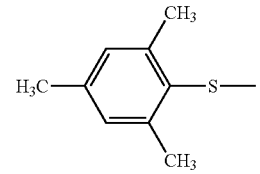 | 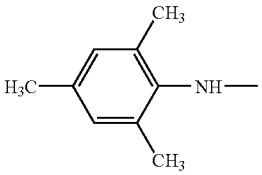 | 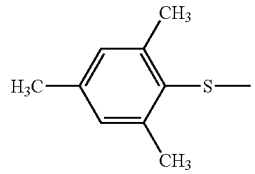 | 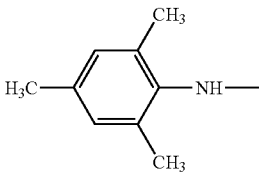 |
| 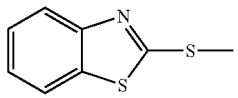 | 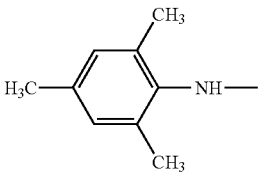 | 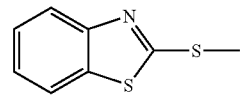 | 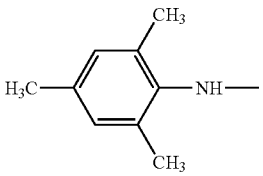 |
| 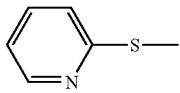 | 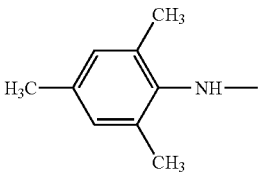 | 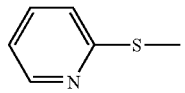 | 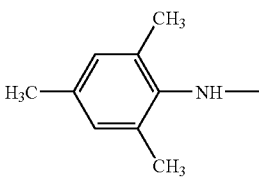 |
| 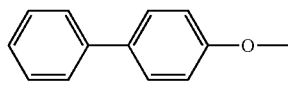 | 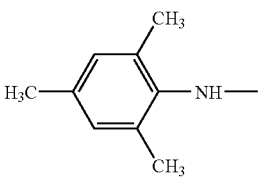 | 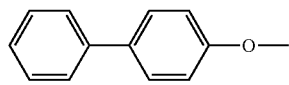 | 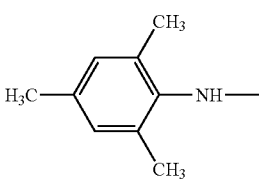 |
| 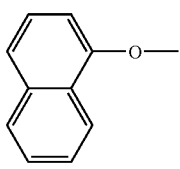 | 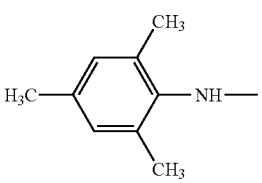 | 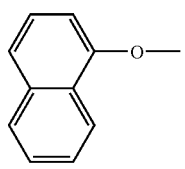 | 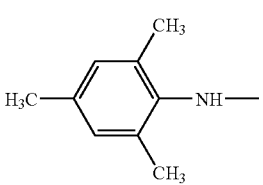 |
| 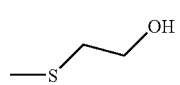 | 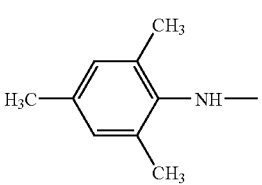 | | 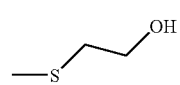 |

TABLE 1-continued

Structure (I): Anthraquinone core with R1 at position 1, R2 at position 3, R3 at position 5, R4 at position 7.

| R₁ | R₂ | R₃ | R₄ |
|---|---|---|---|
| 2,4,6-trimethylphenyl-NH— | —S—CH(CH₃)CH(OH)CH₃ | 2,4,6-trimethylphenyl-NH— | —S—CH(CH₃)CH(OH)CH₃ |
| 2,4,6-trimethylphenyl-NH— | —S—CH₂CH₂COOC₂H₅ | 2,4,6-trimethylphenyl-NH— | —S—CH₂CH₂COOC₂H₅ |
| 2,4,6-trimethylphenyl-NH— | —S—CH₂COOC₂H₅ | 2,4,6-trimethylphenyl-NH— | —S—CH₂COOC₂H₅ |
| 2,4,6-trimethylphenyl-NH— | —S—(CH₂)₄—OH | 2,4,6-trimethylphenyl-NH— | —S—(CH₂)₄—OH |
| 2,4,6-trimethylphenyl-NH— | —S—CH₂CH(OH)CH₂OH | 2,4,6-trimethylphenyl-NH— | —S—CH₂CH(OH)CH₂OH |
| phenyl-CH₂-NH— | phenyl-S— | phenyl-CH₂-NH— | phenyl-S— |
| phenyl-CH₂-NH— | phenyl-O— | phenyl-CH₂-NH— | phenyl-O— |
| phenyl-CH₂-NH— | 2,6-dimethylphenyl-O— | phenyl-CH₂-NH— | 2,6-dimethylphenyl-O— |

TABLE 1-continued (I)

Structure: Anthraquinone with R1 at position 1, R2 at position 3, R3 at position 5, R4 at position 7 (9,10-anthraquinone core with R1–R4 substituents).

| R₁ | R₂ | R₃ | R₄ |
|---|---|---|---|
| phenethylamino (PhCH₂CH₂NH—) | 2,5-dichlorophenylthio | phenethylamino | 2,5-dichlorophenylthio |
| phenethylamino | 4-methoxyphenylthio | phenethylamino | 4-methoxyphenylthio |
| phenethylamino | benzylthio | phenethylamino | benzylthio |
| phenethylamino | 2-naphthylthio | phenethylamino | 2-naphthylthio |
| phenethylamino | 4-methylphenylthio | phenethylamino | 4-methylphenylthio |
| phenethylamino | 2,6-dimethylphenylthio | phenethylamino | 2,6-dimethylphenylthio |
| phenethylamino | 2,4,6-trimethylphenylthio | phenethylamino | 2,4,6-trimethylphenylthio |
| phenethylamino | 2-benzothiazolylthio | phenethylamino | 2-benzothiazolylthio |
| phenethylamino | 2-pyridylthio | phenethylamino | 2-pyridylthio |
| phenethylamino | 4-biphenylyloxy | phenethylamino | 4-biphenylyloxy |

TABLE 1-continued

Structure (I): Anthraquinone core with substituents R₁, R₂, R₃, R₄.

| R₁ | R₂ | R₃ | R₄ |
|---|---|---|---|
| phenethyl-NH— | 1-methoxynaphthyl | phenethyl-NH— | 1-methoxynaphthyl |
| phenethyl-NH— | —S-CH₂CH₂-OH | phenethyl-NH— | —S-CH₂CH₂-OH |
| phenethyl-NH— | —S-CH(CH₃)CH(OH)CH₃ | phenethyl-NH— | —S-CH(CH₃)CH(OH)CH₃ |
| phenethyl-NH— | —S-CH₂CH₂-COOC₂H₅ | phenethyl-NH— | —S-CH₂CH₂-COOC₂H₅ |
| phenethyl-NH— | —S-CH₂-COOC₂H₅ | phenethyl-NH— | —S-CH₂-COOC₂H₅ |
| phenethyl-NH— | —S-(CH₂)₄-OH | phenethyl-NH— | —S-(CH₂)₄-OH |
| phenethyl-NH— | —S-CH₂-CH(OH)-CH₂OH | phenethyl-NH— | —S-CH₂-CH(OH)-CH₂OH |
| HO-CH₂CH₂-C₆H₄-NH— | —S-C₆H₅ | HO-CH₂CH₂-C₆H₄-NH— | —S-C₆H₅ |
| HO-CH₂CH₂-C₆H₄-NH— | —O-C₆H₅ | HO-CH₂CH₂-C₆H₄-NH— | —O-C₆H₅ |
| HO-CH₂CH₂-C₆H₄-NH— | —O-(2,6-dimethylphenyl) | HO-CH₂CH₂-C₆H₄-NH— | —O-(2,6-dimethylphenyl) |

TABLE 1-continued

Structural formula (I): anthraquinone with substituents R1 (position 1), R2 (position 3), R3 (position 5), R4 (position 7).

| R₁ | R₂ | R₃ | R₄ |
|---|---|---|---|
| HOCH₂CH₂-C₆H₄-NH- | 2,5-dichlorophenyl-S- | HOCH₂CH₂-C₆H₄-NH- | 2,5-dichlorophenyl-S- |
| HOCH₂CH₂-C₆H₄-NH- | 4-methoxyphenyl-S- | HOCH₂CH₂-C₆H₄-NH- | 4-methoxyphenyl-S- |
| HOCH₂CH₂-C₆H₄-NH- | benzyl-S- | HOCH₂CH₂-C₆H₄-NH- | benzyl-S- |
| HOCH₂CH₂-C₆H₄-NH- | 2-naphthyl-S- | HOCH₂CH₂-C₆H₄-NH- | 2-naphthyl-S- |
| HOCH₂CH₂-C₆H₄-NH- | 4-methylphenyl-S- | HOCH₂CH₂-C₆H₄-NH- | 4-methylphenyl-S- |
| HOCH₂CH₂-C₆H₄-NH- | 2,6-dimethylphenyl-S- | HOCH₂CH₂-C₆H₄-NH- | 2,6-dimethylphenyl-S- |
| HOCH₂CH₂-C₆H₄-NH- | 2,4,6-trimethylphenyl-S- | HOCH₂CH₂-C₆H₄-NH- | 2,4,6-trimethylphenyl-S- |
| HOCH₂CH₂-C₆H₄-NH- | benzothiazol-2-yl-S- | HOCH₂CH₂-C₆H₄-NH- | benzothiazol-2-yl-S- |
| HOCH₂CH₂-C₆H₄-NH- | pyridin-2-yl-S- | HOCH₂CH₂-C₆H₄-NH- | pyridin-2-yl-S- |
| HOCH₂CH₂-C₆H₄-NH- | 4'-methoxybiphenyl-4-yl-O- | HOCH₂CH₂-C₆H₄-NH- | 4'-methoxybiphenyl-4-yl-NH- |

TABLE 1-continued

Structure (I): Anthraquinone core with substituents R1 (position 1), R2 (position 3), R3 (position 5), R4 (position 7).

| R₁ | R₂ | R₃ | R₄ |
|---|---|---|---|
| HOCH₂CH₂-C₆H₄-NH— | 1-methoxynaphthyl (—O-naphthyl) | HOCH₂CH₂-C₆H₄-NH— | 1-methoxynaphthyl (—O-naphthyl) |
| HOCH₂CH₂-C₆H₄-NH— | —S-CH₂CH₂-OH | HOCH₂CH₂-C₆H₄-NH— | —S-CH₂CH₂-OH |
| HOCH₂CH₂-C₆H₄-NH— | —S-CH(CH₃)-CH(OH)-CH₃ | HOCH₂CH₂-C₆H₄-NH— | —S-CH(CH₃)-CH(OH)-CH₃ |
| HOCH₂CH₂-C₆H₄-NH— | —S-CH₂CH₂-COOC₂H₅ | HOCH₂CH₂-C₆H₄-NH— | —S-CH₂CH₂-COOC₂H₅ |
| HOCH₂CH₂-C₆H₄-NH— | —S-CH₂-COOC₂H₅ | HOCH₂CH₂-C₆H₄-NH— | —S-CH₂-COOC₂H₅ |
| HOCH₂CH₂-C₆H₄-NH— | —S-(CH₂)₄-OH | HOCH₂CH₂-C₆H₄-NH— | —S-(CH₂)₄-OH |
| HOCH₂CH₂-C₆H₄-NH— | —S-CH₂-CH(OH)-CH₂-OH | HOCH₂CH₂-C₆H₄-NH— | —S-CH₂-CH(OH)-CH₂-OH |
| 2-ethylphenyl-NH— | —S-C₆H₅ | 2-ethylphenyl-NH— | —S-C₆H₅ |
| 2-ethylphenyl-NH— | —O-C₆H₅ | 2-ethylphenyl-NH— | —O-C₆H₅ |
| 2-ethylphenyl-NH— | 2,6-dimethylphenyl-O— | 2-ethylphenyl-NH— | 2,6-dimethylphenyl-O— |

TABLE 1-continued
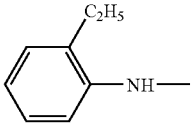
| R₁ | R₂ | R₃ | R₄ |
|---|---|---|---|
| 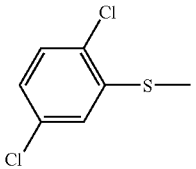 | 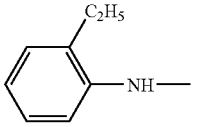 | 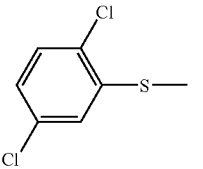 | 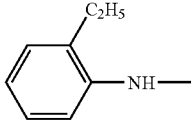 |
|  | 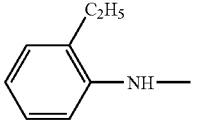 |  | 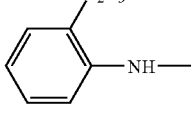 |
| 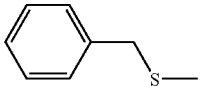 | 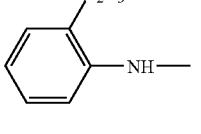 | 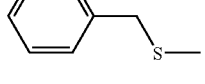 | 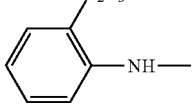 |
| 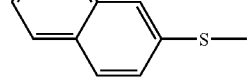 | 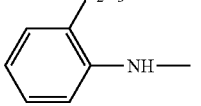 | 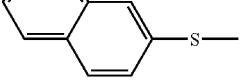 | 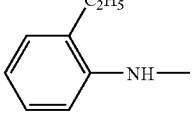 |
|  | 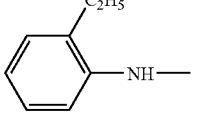 | 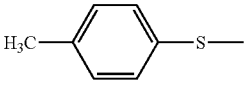 | 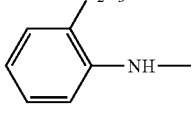 |
| 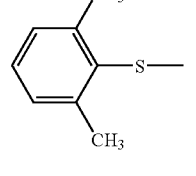 | 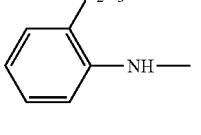 | 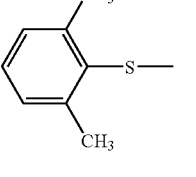 | 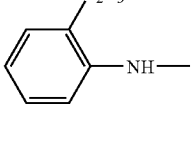 |
| 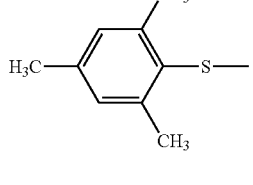 | 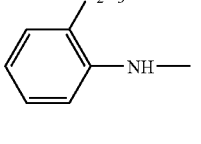 | 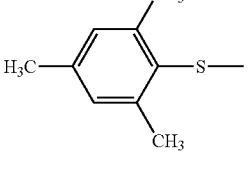 | 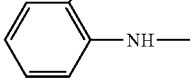 |
| 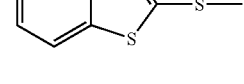 | 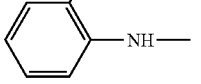 | 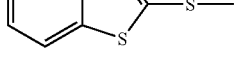 | |

TABLE 1-continued
| R₁ | R₂ | R₃ | R₄ |
|---|---|---|---|
| 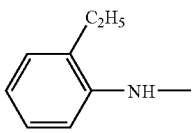 | 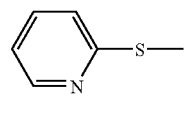 | 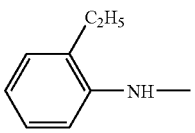 | 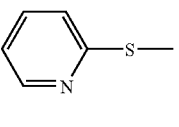 |
| 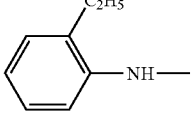 | 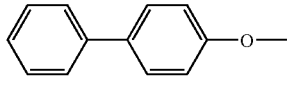 | 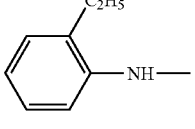 | 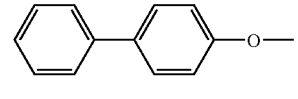 |
| 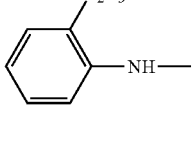 | 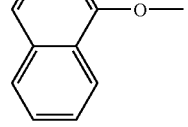 | 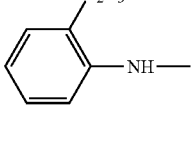 | 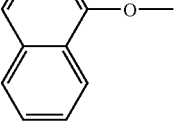 |
| 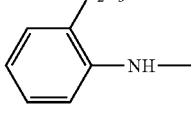 | 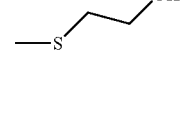 | 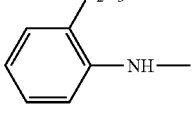 | 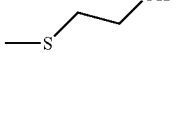 |
| 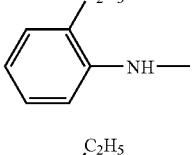 | 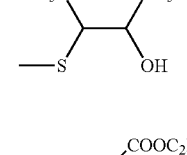 | 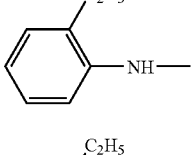 | 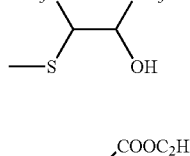 |
| 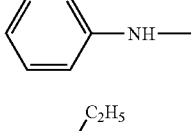 | 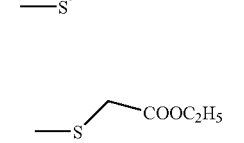 | 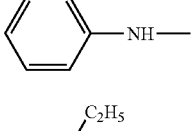 | 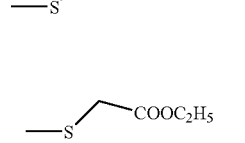 |
| 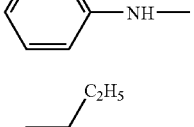 |  | 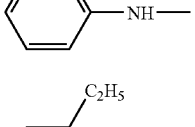 |  |
| 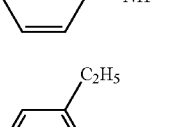 | 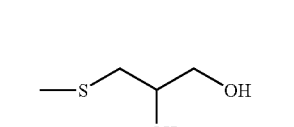 | 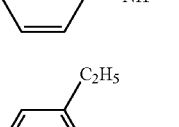 | 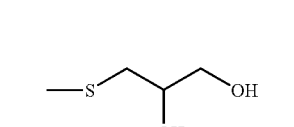 |
|  |  |  |  |

TABLE 1-continued

Structure (I): Anthraquinone with substituents $R_1$ at position 1, $R_2$ at position 3, $R_3$ at position 5, $R_4$ at position 7.

| $R_1$ | $R_2$ | $R_3$ | $R_4$ |
|---|---|---|---|
| Ph-SO$_2$NH— | Ph-S— | Ph-SO$_2$NH— | Ph-S— |
| Ph-SO$_2$NH— | Ph-O— | Ph-SO$_2$NH— | Ph-O— |
| Ph-SO$_2$NH— | 2,6-dimethylphenyl-O— | Ph-SO$_2$NH— | 2,6-dimethylphenyl-O— |
| Ph-SO$_2$NH— | 2,5-dichlorophenyl-S— | Ph-SO$_2$NH— | 2,5-dichlorophenyl-S— |
| Ph-SO$_2$NH— | 4-methoxyphenyl-S— | Ph-SO$_2$NH— | 4-methoxyphenyl-S— |
| Ph-SO$_2$NH— | PhCH$_2$-S— | Ph-SO$_2$NH— | PhCH$_2$-S— |
| Ph-SO$_2$NH— | 2-naphthyl-S— | Ph-SO$_2$NH— | 2-naphthyl-S— |
| Ph-SO$_2$NH— | 4-methylphenyl-S— | Ph-SO$_2$NH— | 4-methylphenyl-S— |
| Ph-SO$_2$NH— | 2,6-dimethylphenyl-S— | Ph-SO$_2$NH— | 2,6-dimethylphenyl-S— |

TABLE 1-continued

Structure (I): Anthraquinone with substituents $R_1$ (position 1), $R_2$ (position 6), $R_3$ (position 5), $R_4$ (position 3).

| $R_1$ | $R_2$ | $R_3$ | $R_4$ |
|---|---|---|---|
| C₆H₅—SO₂NH— | 2,4,6-trimethylphenyl-S— | C₆H₅—SO₂NH— | 2,4,6-trimethylphenyl-S— |
| C₆H₅—SO₂NH— | benzothiazol-2-yl-S— | C₆H₅—SO₂NH— | benzothiazol-2-yl-S— |
| C₆H₅—SO₂NH— | pyridin-2-yl-S— | C₆H₅—SO₂NH— | pyridin-2-yl-S— |
| C₆H₅—SO₂NH— | 4-methoxybiphenyl-4'-yl-O— | C₆H₅—SO₂NH— | 4-methoxybiphenyl-4'-yl-O— |
| C₆H₅—SO₂NH— | 1-methoxynaphthalen-? —O— | C₆H₅—SO₂NH— | 1-methoxynaphthalen-? —O— |
| C₆H₅—SO₂NH— | —S—CH₂CH₂—OH | C₆H₅—SO₂NH— | —S—CH₂CH₂—OH |
| C₆H₅—SO₂NH— | —CH(CH₃)—CH(OH)—CH₃ with S | C₆H₅—SO₂NH— | —CH(CH₃)—CH(OH)—CH₃ with S |
| C₆H₅—SO₂NH— | —S—CH₂CH₂—COOC₂H₅ | C₆H₅—SO₂NH— | —S—CH₂CH₂—COOC₂H₅ |
| C₆H₅—SO₂NH— | —S—CH₂—COOC₂H₅ | C₆H₅—SO₂NH— | —S—CH₂—COOC₂H₅ |
| C₆H₅—SO₂NH— | —S—(CH₂)₄—OH | C₆H₅—SO₂NH— | —S—(CH₂)₄—OH |
| C₆H₅—SO₂NH— | —S—CH₂—CH(OH)—CH₂—OH | C₆H₅—SO₂NH— | —S—CH₂—CH(OH)—CH₂—OH |

TABLE 1-continued

Structure (I): Anthraquinone core with substituents R₁ (position 1), R₂ (position 6), R₃ (position 4), R₄ (position 7).

| R₁ | R₂ | R₃ | R₄ |
|---|---|---|---|
| Ph-CONH- | Ph-S- | Ph-CONH- | Ph-S- |
| Ph-CONH- | Ph-O- | Ph-CONH- | Ph-O- |
| Ph-CONH- | 2,6-(CH₃)₂-C₆H₃-O- | Ph-CONH- | 2,6-(CH₃)₂-C₆H₃-O- |
| Ph-CONH- | 2,5-Cl₂-C₆H₃-S- | Ph-CONH- | 2,5-Cl₂-C₆H₃-S- |
| Ph-CONH- | 4-CH₃O-C₆H₄-S- | Ph-CONH- | 4-CH₃O-C₆H₄-S- |
| Ph-CONH- | PhCH₂-S- | Ph-CONH- | PhCH₂-S- |
| Ph-CONH- | 2-naphthyl-S- | Ph-CONH- | 2-naphthyl-S- |
| Ph-CONH- | 4-CH₃-C₆H₄-S- | Ph-CONH- | 4-CH₃-C₆H₄-S- |
| Ph-CONH- | 2,6-(CH₃)₂-C₆H₃-S- | Ph-CONH- | 2,6-(CH₃)₂-C₆H₃-S- |

TABLE 1-continued (I)

| R₁ | R₂ | R₃ | R₄ |
|---|---|---|---|
| C₆H₅-CONH— | 2,4,6-trimethylphenyl-S— | C₆H₅-CONH— | 2,4,6-trimethylphenyl-S— |
| C₆H₅-CONH— | benzothiazol-2-yl-S— | C₆H₅-CONH— | benzothiazol-2-yl-S— |
| C₆H₅-CONH— | pyridin-2-yl-S— | C₆H₅-CONH— | pyridin-2-yl-S— |
| C₆H₅-CONH— | 4-methoxybiphenyl-O— | C₆H₅-CONH— | 4-methoxybiphenyl-O— |
| C₆H₅-CONH— | 1-methoxynaphthyl-O— | C₆H₅-CONH— | 1-methoxynaphthyl-O— |
| C₆H₅-CONH— | —S-CH₂CH₂-OH | C₆H₅-CONH— | —S-CH₂CH₂-OH |
| C₆H₅-CONH— | —S-CH(CH₃)CH(OH)CH₃ | C₆H₅-CONH— | —S-CH(CH₃)CH(OH)CH₃ |
| C₆H₅-CONH— | —S-CH₂CH₂-COOC₂H₅ | C₆H₅-CONH— | —S-CH₂CH₂-COOC₂H₅ |
| C₆H₅-CONH— | —S-CH₂-COOC₂H₅ | C₆H₅-CONH— | —S-CH₂-COOC₂H₅ |
| C₆H₅-CONH— | —S-(CH₂)₅-OH | C₆H₅-CONH— | —S-(CH₂)₅-OH |
| C₆H₅-CONH— | —S-CH₂-CH(OH)-CH₂OH | C₆H₅-CONH— | —S-CH₂-CH(OH)-CH₂OH |

TABLE 1-continued
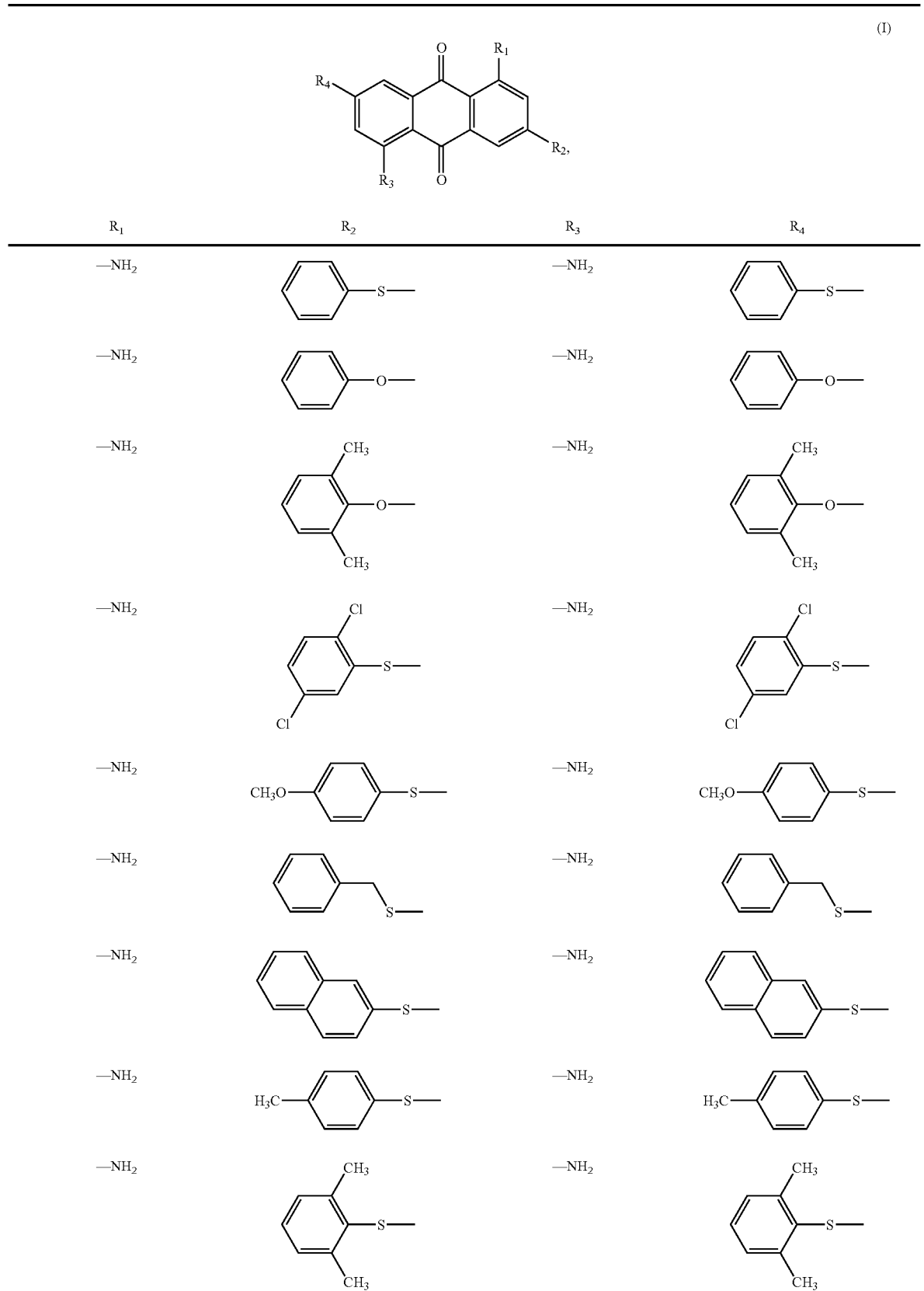

TABLE 1-continued
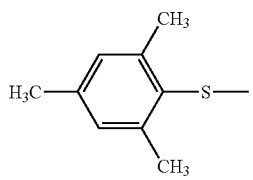
| R₁ | R₂ | R₃ | R₄ |
|---|---|---|---|
| —NH₂ | 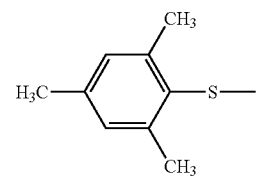 | —NH₂ | 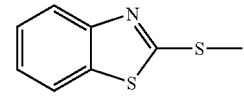 |
| —NH₂ | 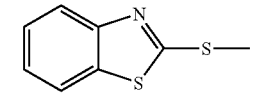 | —NH₂ | 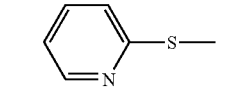 |
| —NH₂ | 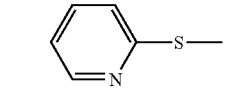 | —NH₂ | 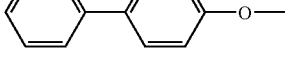 |
| —NH₂ | 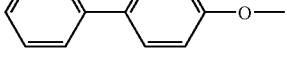 | —NH₂ | 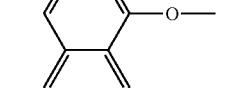 |
| —NH₂ | 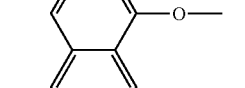 | —NH₂ | 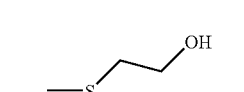 |
| —NH₂ | 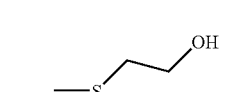 | —NH₂ | 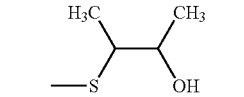 |
| —NH₂ | 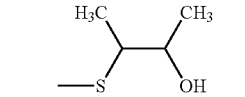 | —NH₂ | 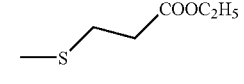 |
| —NH₂ | 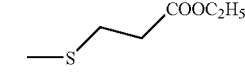 | —NH₂ | 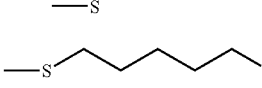 |
| —NH₂ | 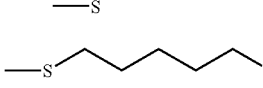 | —NH₂ | 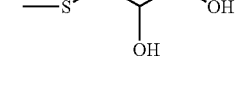 |
| —NH₂ | 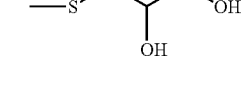 | —NH₂ | 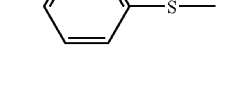 |
| —NH₂ | | —NH₂ | |
| —NHCH₂CH₂OH | 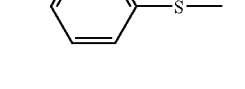 | —NHCH₂CH₂OH | |

TABLE 1-continued

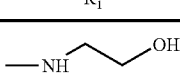

| R₁ | R₂ | R₃ | R₄ |
|---|---|---|---|
| —NH—CH₂CH₂—OH | —O—C₆H₅ | —NH—CH₂CH₂—OH | —O—C₆H₅ |
| —NH—CH₂CH₂—OH | —O—(2,6-dimethylphenyl) | —NH—CH₂CH₂—OH | —O—(2,6-dimethylphenyl) |
| —NH—CH₂CH₂—OH | —S—(2,5-dichlorophenyl) | —NH—CH₂CH₂—OH | —S—(2,5-dichlorophenyl) |
| —NH—CH₂CH₂—OH | —S—(4-methoxyphenyl) | —NH—CH₂CH₂—OH | —S—(4-methoxyphenyl) |
| —NH—CH₂CH₂—OH | —S—CH₂—C₆H₅ | —NH—CH₂CH₂—OH | —S—CH₂—C₆H₅ |
| —NH—CH₂CH₂—OH | —S—(2-naphthyl) | —NH—CH₂CH₂—OH | —S—(2-naphthyl) |
| —NH—CH₂CH₂—OH | —S—(4-methylphenyl) | —NH—CH₂CH₂—OH | —S—(4-methylphenyl) |
| —NH—CH₂CH₂—OH | —S—(2,6-dimethylphenyl) | —NH—CH₂CH₂—OH | —S—(2,6-dimethylphenyl) |
| —NH—CH₂CH₂—OH | —S—(2,4,6-trimethylphenyl) | —NH—CH₂CH₂—OH | —S—(2,4,6-trimethylphenyl) |

TABLE 1-continued
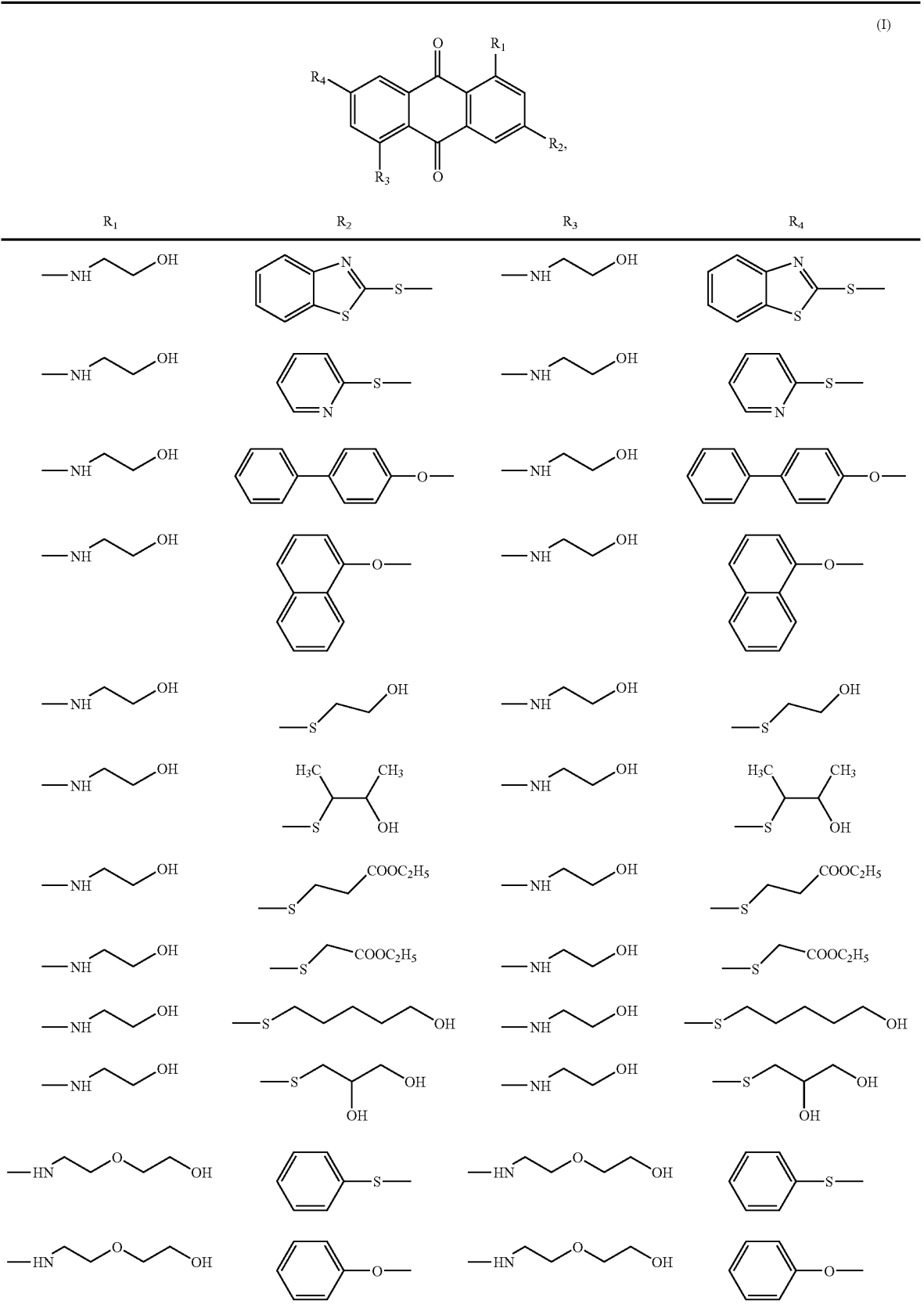

TABLE 1-continued

Structure (I): Anthraquinone core with R1 at position 1, R2 at position 3, R3 at position 5, R4 at position 7.

| R1 | R2 | R3 | R4 |
|---|---|---|---|
| —HN-CH2CH2-O-CH2CH2-OH | 2,6-dimethyl-methoxyphenyl | —HN-CH2CH2-O-CH2CH2-OH | 2,6-dimethyl-methoxyphenyl |
| —HN-CH2CH2-O-CH2CH2-OH | 2,5-dichlorophenyl-S— | —HN-CH2CH2-O-CH2CH2-OH | 2,5-dichlorophenyl-S— |
| —HN-CH2CH2-O-CH2CH2-OH | 4-methoxyphenyl-S— | —HN-CH2CH2-O-CH2CH2-OH | 4-methoxyphenyl-S— |
| —HN-CH2CH2-O-CH2CH2-OH | benzyl-S— | —HN-CH2CH2-O-CH2CH2-OH | benzyl-S— |
| —HN-CH2CH2-O-CH2CH2-OH | 2-naphthyl-S— | —HN-CH2CH2-O-CH2CH2-OH | 2-naphthyl-S— |
| —HN-CH2CH2-O-CH2CH2-OH | 4-methylphenyl-S— | —HN-CH2CH2-O-CH2CH2-OH | 4-methylphenyl-S— |
| —HN-CH2CH2-O-CH2CH2-OH | 2,6-dimethylphenyl-S— | —HN-CH2CH2-O-CH2CH2-OH | 2,6-dimethylphenyl-S— |
| —HN-CH2CH2-O-CH2CH2-OH | 2,4,6-trimethylphenyl-S— | —HN-CH2CH2-O-CH2CH2-OH | 2,4,6-trimethylphenyl-S— |
| —HN-CH2CH2-O-CH2CH2-OH | benzothiazol-2-yl-S— | —HN-CH2CH2-O-CH2CH2-OH | benzothiazol-2-yl-S— |

TABLE 1-continued

Structure (I): Anthraquinone core with R1 (position 1), R2 (position 3), R3 (position 5), R4 (position 7), and two C=O groups at positions 9 and 10.

| R₁ | R₂ | R₃ | R₄ |
|---|---|---|---|
| —HN−CH₂CH₂−O−CH₂CH₂−OH | 2-pyridyl-S− | —HN−CH₂CH₂−O−CH₂CH₂−OH | 2-pyridyl-S− |
| —HN−CH₂CH₂−O−CH₂CH₂−OH | 4-phenyl-phenyl-O− | —HN−CH₂CH₂−O−CH₂CH₂−OH | 4-phenyl-phenyl-O− |
| —HN−CH₂CH₂−O−CH₂CH₂−OH | 1-naphthyl-O− | —HN−CH₂CH₂−O−CH₂CH₂−OH | 1-naphthyl-O− |
| —HN−CH₂CH₂−O−CH₂CH₂−OH | —S−CH₂CH₂−OH | —HN−CH₂CH₂−O−CH₂CH₂−OH | —S−CH₂CH₂−OH |
| —HN−CH₂CH₂−O−CH₂CH₂−OH | —S−CH(CH₃)−CH(OH)−CH₃ | —HN−CH₂CH₂−O−CH₂CH₂−OH | —S−CH(CH₃)−CH(OH)−CH₃ |
| —HN−CH₂CH₂−O−CH₂CH₂−OH | —S−CH₂CH₂−COOC₂H₅ | —HN−CH₂CH₂−O−CH₂CH₂−OH | —S−CH₂CH₂−COOC₂H₅ |
| —HN−CH₂CH₂−O−CH₂CH₂−OH | —S−CH₂−COOC₂H₅ | —HN−CH₂CH₂−O−CH₂CH₂−OH | —S−CH₂−COOC₂H₅ |
| —HN−CH₂CH₂−O−CH₂CH₂−OH | —S−(CH₂)₄−OH | —HN−CH₂CH₂−O−CH₂CH₂−OH | —S−(CH₂)₄−OH |
| —HN−CH₂CH₂−O−CH₂CH₂−OH | —S−CH₂−CH(OH)−CH₂OH | —HN−CH₂CH₂−O−CH₂CH₂−OH | —S−CH₂−CH(OH)−CH₂OH |
| —HN−CH₂−CH(OH)−CH₂OH | phenyl-S− | —HN−CH₂−CH(OH)−CH₂OH | phenyl-S− |
| —HN−CH₂−CH(OH)−CH₂OH | phenyl-O− | —HN−CH₂−CH(OH)−CH₂OH | phenyl-O− |
| —HN−CH₂−CH(OH)−CH₂OH | 2,6-dimethylphenyl-O− | —HN−CH₂−CH(OH)−CH₂OH | 2,6-dimethylphenyl-O− |

TABLE 1-continued
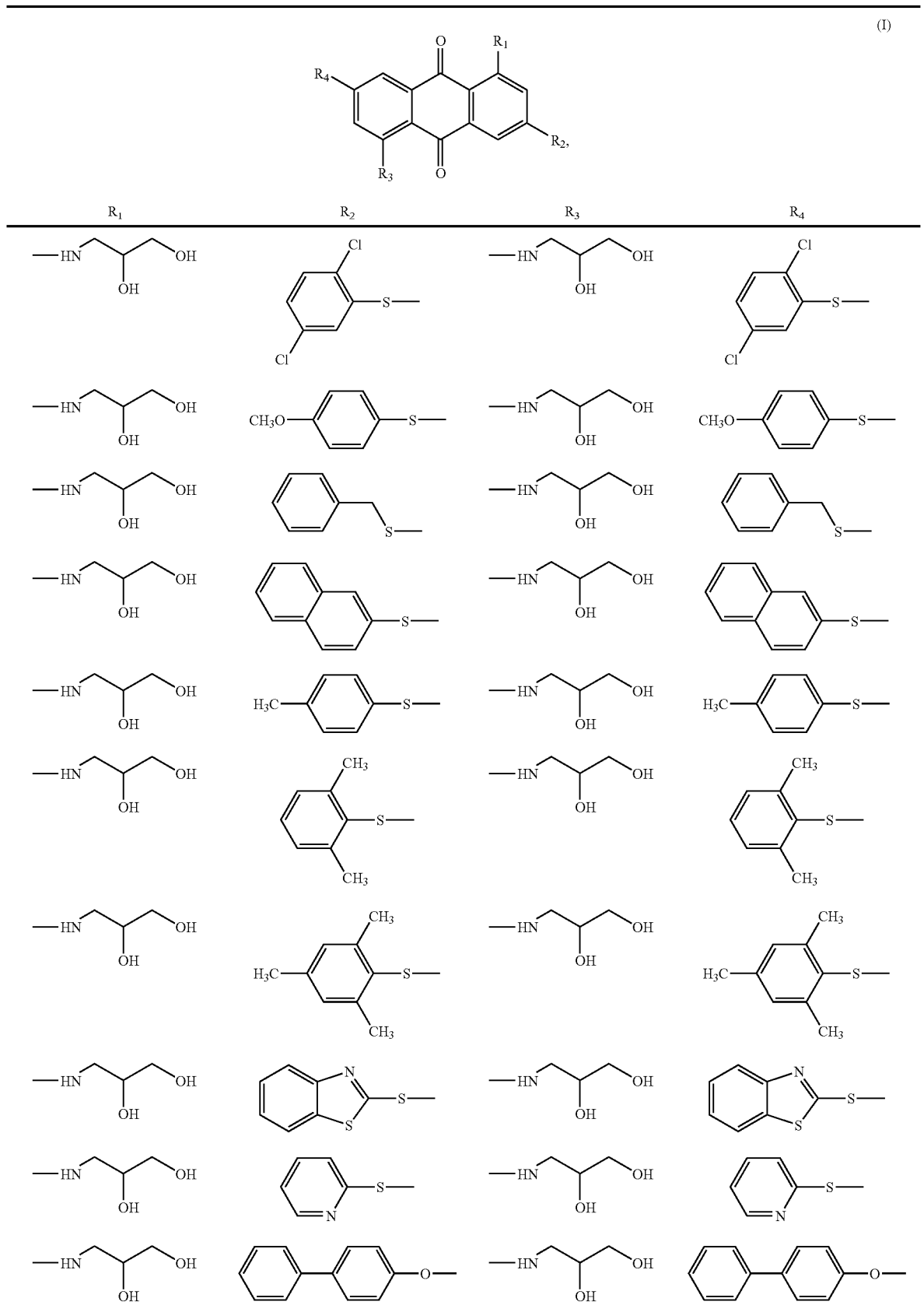

TABLE 1-continued

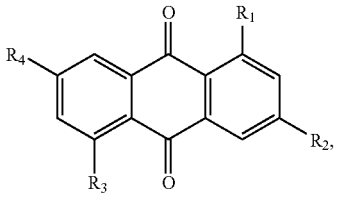

| R₁ | R₂ | R₃ | R₄ |
|---|---|---|---|
| 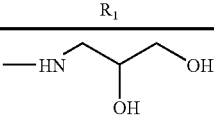 | 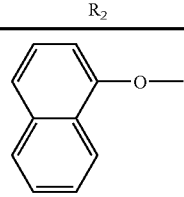 | 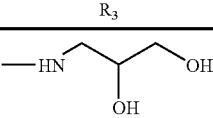 | 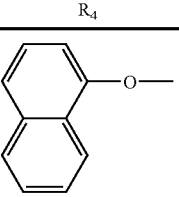 |
| 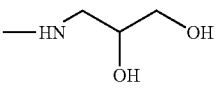 | 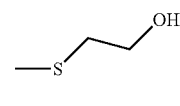 | 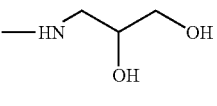 | 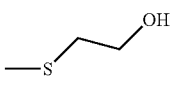 |
| 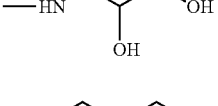 | 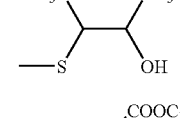 | 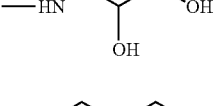 | 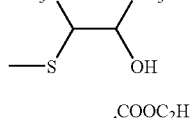 |
| 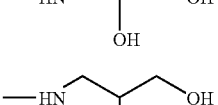 | 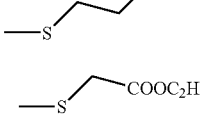 | 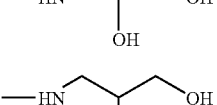 | 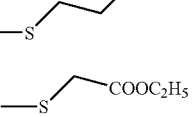 |
| 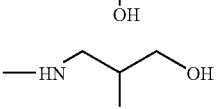 | 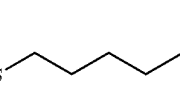 | 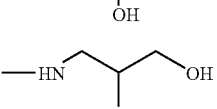 | 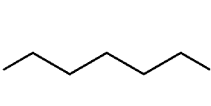 |
| 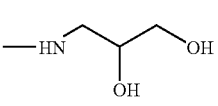 | 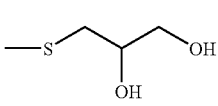 | 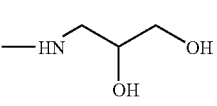 | 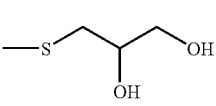 |
| 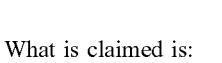 |  | 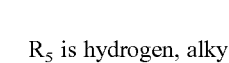 | 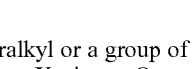 |

What is claimed is:

1. A compound of formula I

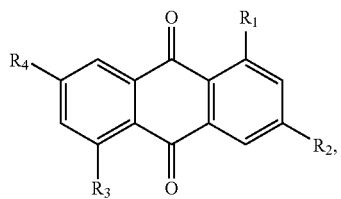

wherein
$R_1$ and $R_3$ are each independently of the other —NHR₅, —NHSO₂R₅, —NHCOR₅, —OR₆ or —SR₇,
$R_2$ and $R_4$ are each independently of the other —OR₆ or —SR₇,
with the proviso that not all of the substituents $R_1$ to $R_4$ are —SR₇, $R_5$ is hydrogen, alkyl, aryl, aralkyl or a group of formula —(C$_n$H$_{2n}$X)$_m$—H wherein X is —O—, —S—, —SO₂—, —NH—, —NR₈—, —CONH— or —CONR₈— and R₈ is alkyl or aryl, n is a number from 2 to 6 and the m is a number from 1 to 10, $R_6$ is an unsubstituted aryl or unsubstituted heteroaryl and $R_7$ is alkyl, unsubstituted aryl, unsubstituted heteroaryl or a group of formula —(C$_n$H$_{2n}$X)$_m$—H wherein X is —O—, —S—, —SO₂, —NH—, —NR₈—, —CONH— or —CONR₈ and R₈ is alkyl or aryl, n is a number from 2 to 6 and m is a number from 1 to 10.

2. A compound of formula I according to claim 1 wherein $R_1$ and $R_3$ are —NHR₅ or —SR₇ and R₅ and R₇ are as defined in claim 1.

3. A compound of formula I according to claim 1 wherein $R_1$ and $R_3$ are —NHR₅ or —SR₇ and R₅ and R₇ are unsubstituted aryl or hydroxyalkyl.

4. A compound of formula I according to claim 3 wherein $R_5$ is phenyl, mesityl or 2-hydroxyethyl and $R_7$ is phenyl.

5. A compound of formula I according to claim 1 wherein $R_2$ and $R_4$ are —SR₇ and $R_7$ is as defined in claim 1.

6. A compound of formula I according to claim 5 wherein $R_7$ is unsubstituted aryl or hydroxyalkyl.

7. A compound of formula I according to claim 6 wherein $R_7$ is phenyl or 2-hydroxyethyl.

8. A compound of formula I according to claim 1 according to any one of formulae Ia to Ic

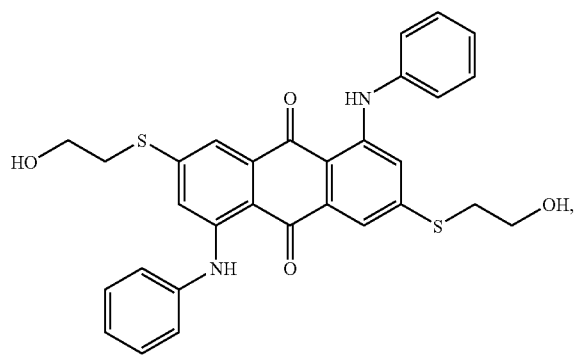

(Ia)

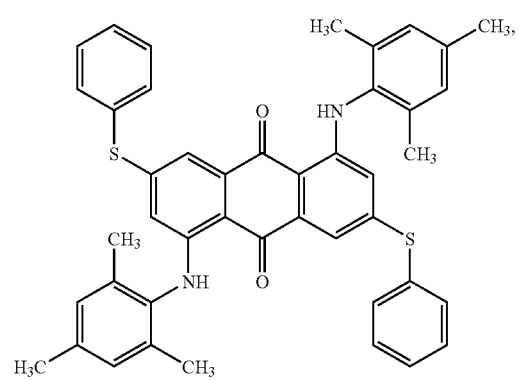

(Ib)

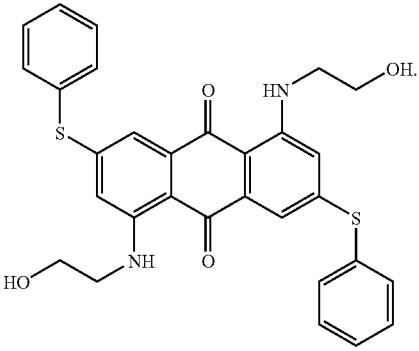

(Ic)

9. A process for the preparation of a compound of formula I according to claim 1 which comprises reacting 1,3,5,7-tetrabromoanthraquinone with a compound $R_1$—H or with a mixture of the compounds $R_1$—H and $R_3$—H in a first reaction step, and then reacting the so-prepared intermediate with a compound $R_2$—H or with a mixture of the compounds $R_2$—H and $R_4$—H, $R_1$, $R_2$, $R_3$ and $R_4$ being as defined in claim 1.

10. A method of producing mass-coloured plastics or polymeric colour particles that comprises mixing a high molecular weight organic material and a tinctorially effective amount of at least one compound of formula I.

11. A method of producing mass-coloured plastics or polymeric colour particles that comprises causing a mixture comprising at least one monomer that contains at least one NH—, OH— or SH-reactive group and is capable of polymerisation, polyaddition or polycondensation reactions to react with at least one compound of formula I according to claim 1 that contains at least two NH, OH or SH groups.

12. Plastics or polymeric colour particles coloured in accordance with a method according to claim 10.

13. Plastics or polymeric colour particles coloured in accordance with a method according to claim 11.

14. A method of producing colour filters that comprises coating a substrate with a high molecular weight organic material that contains a tinctorially effective amount of at least one compound of formula (I) according to claim 1.

* * * * *